United States Patent
Hackl et al.

[11] Patent Number: 5,887,675
[45] Date of Patent: Mar. 30, 1999

[54] STEERING SYSTEM FOR A MOTOR VEHICLE

[75] Inventors: Matthias Hackl, Vaihingen; Wolfgang Kraemer, Stuttgart, both of Germany

[73] Assignee: Robert Bosch GmbH, Stuttgart, Germany

[21] Appl. No.: 777,973

[22] Filed: Dec. 24, 1996

[30] Foreign Application Priority Data

Jan. 19, 1996 [DE] Germany ............ 196 01 826.9

[51] Int. Cl.⁶ ............................................. B62D 5/04
[52] U.S. Cl. .......................... 180/422; 180/446; 701/41
[58] Field of Search .................................. 180/421, 422, 180/446, 444, 443; 701/41, 42

[56] References Cited

U.S. PATENT DOCUMENTS

| | | | |
|---|---|---|---|
| 5,203,421 | 4/1993 | Ueno et al. | 180/446 |
| 5,205,371 | 4/1993 | Karnopp | 180/79.1 |
| 5,265,019 | 11/1993 | Harara et al. | 180/446 |
| 5,423,391 | 6/1995 | Shimizu | 180/446 |

FOREIGN PATENT DOCUMENTS 42 43 267 A1  12/1992  Germany.

*Primary Examiner*—Kevin Hurley
*Attorney, Agent, or Firm*—Baker & Daniels

[57] ABSTRACT

A steering system for a motor vehicle, comprising at least one steered axle, an actuator, an actuator motor and a steering mechanism. The actuator and the steering mechanism, respectively, each have a mechanical gear ratio. The steered axle, the actuator motor, the actuator and the steering mechanism are operatively connected with one another. Steering movements initiated by the driver and movements initiated by the actuator motor are superimposed by the actuator. The superimposed movement is passed to the steering gear, which relays this movement as steering angle to the wheels of the steered axle. The steering gear mechanical gear ratio is configured to be variable which enables selectively adjustable relationships between the steering wheel movements and the steering angles of the steered wheels and avoids the loss of good steering feel for the driver.

14 Claims, 4 Drawing Sheets

STEERING SYSTEM FOR A MOTOR VEHICLE

BACKGROUND OF THE INVENTION

1. Field of the Invention

The present invention relates to an automotive steering system.

2. Related Art

In conventional steering systems, the steering movements initiated by the driver via the steering wheel are transferred to the steered wheels by means of a steering gear, and as the case may be, aided by an assist force. Moreover, there are steering systems where the steering movements initiated by the driver are superimposed upon further steering movements initiated by an actuator. Such a system is known from DE-OS 40 31 316 (corresponding to U.S. Pat. No. 5,205,371). In this system, an actuator is provided between the steering wheel actuated by the driver and the steering gear, with the aid of which actuator an actuator movement can be superimposed on the driver's steering movements. Such a system assures that the steering angle of the steered wheels of a vehicle is not at a fixed ratio to the turning angle of the steering wheel actuated by the driver.

This makes possible, among others, a steering assist for the driver that is dependent on the steering angle and in addition, there are many options of variation given for having additional steering signals act upon the steering system. Envisaged with the additional steering signals, specifically, are increased road safety and/or travel comfort.

A problem that may be involved with such power-assisted steering that employs superimposition of movement is that the selection of a constant gear ratio for the steering gear as established in its design and that the actuator fails to achieve acceptable steering wheel moments or a good steering feel for all states of travel. In particular, the steering wheel moment must at large steering angles not become excessive while the vehicle is at rest, whereas with the vehicle traveling at high speed the steering wheel moment must not become insufficient.

An overlay steering mechanism of other design can be seen from DE-OS 42 43 267.

The objective underlying the present invention is to improve the driver's steering feel in case of a steering that employs superimposition of movement.

SUMMARY OF THE INVENTION

The present invention is based on a steering system, or steering device, for a motor vehicle with at least one steered axle, an actuator motor, an actuator and a steering gear. The overlay transmission and the steering gear each feature a mechanical gear ratio. The steered axle, the actuator, the actuator and the steering system are in working connection with one another. A superimposition of the steering movement initiated by the driver, upon the movements initiated by the actuator, takes place by means of the overlay transmission. The overall movement thus obtained is fed to the steering gear, which relays said overall movement as steering angle to the wheels of the steered axle.

The core of the invention is that the mechanical gear ratio of the steering gear is designed variable. Hence, the invention consists of a combination of a feedback transmission with a steering gear, or with a steering mechanism, with variable gear ratio. The inventional combination, for one, leads favorably to selectively adjustable relations between the steering wheel movements and the steering angles of the steered wheels, without the necessity, for another, of losing good steering feel on the driver's part. Obtained as compared to an overlay transmission with a constant steering gear ratio, specifically, are more favorable steering wheel moments, or a better steering feel.

The invention can be used, e.g., in steering systems such as cited in the initially mentioned DE-OS 40 31 316 or in DE-OS 42 43 267. Envisaged in DE-OS 40 31 316 is a variable gear ratio of the steering system 6 shown there in FIG. 1, while in DE-OS 42 43 267 a variable gear ratio is envisaged of the steering gear (L) illustrated there in FIG. 1. Steering gears with variable gear ratio are known from the prior art (refer to, e.g., "EVOLUTION in der Lenkungstechnologie" [Evolution in Steering Technology], Automobilindustrie April/May-91, pages 315 through 321). Named as an advantage of the invention, in particular, is that the corrective steering interventions, for instance for vehicle stabilization, are possible also, without restriction, with the gear ratio of the steering gear configured to be variable.

A favorable embodiment of the invention provides for a design of the gear ratio of the steering gear such that the gear ratio is smaller with smaller steering angles than with steering angles of greater magnitude. This embodiment of the invention enables the aforementioned good steering feel of the driver.

The steering movement initiated by the driver can be represented by the steering wheel angle of the steering wheel actuated by the driver. A turning angle initiated by the actuator motor is then superimposed on said steering wheel angle by means of the actuator.

According to the above mentioned prior art, a turning angle of the actuator is superimposed on the steering wheel angle, the actuator being activated depending on the steering wheel angle and/or depending on vehicle movements. A favorable embodiment of the invention provides for the turning angle initiated by the actuator motor, furthermore, to be dependent on the variable-design mechanical gear ratio of the steering gear.

Acting on the steered wheels, as known, is a reactive moment which via the steering gear and the actuator acts as a steering wheel moment on the steering wheel actuated by the driver. An inventional design option is configuring the mechanical gear ratio of the steering gear in such a way that said reactive moment, at smaller steering angles, is less heavily effective on the steering wheel than it is with larger steering angles.

Furthermore, the invention relates to a steering device for a motor vehicle with a steering wheel that is actuated by the driver and is in working connection with a first input shaft of an actuator. The output of the actuator is in working connection with the input shaft of a steering gear, and the steering gear is via the steering linkage connected to the steered wheels. Moreover, the actuator features a second input shaft that is in working connection with the actuator motor. The core of the inventional steering connection is that the mechanical gear ratio of the steering gear is of variable design.

Other advantages of the inventional steering device include a gear ratio of the steering gear designed such that the gear ratio in the case of smaller turns of the input shaft of the steering gear will be smaller than it is with larger turns of the input shaft of the steering gear.

A further advantage of the invention is that straight-ahead travel of the vehicle requires only a low energy consumption.

BRIEF DESCRIPTION OF THE DRAWINGS

FIG. 3 shows the pattern of the inventional variable-design gear ratio of the steering gear, while

DETAILED DESCRIPTION OF THE PREFERRED EMBODIMENT

The invention is illustrated hereafter in detail with the aid of an exemplary embodiment.

Figure 1:
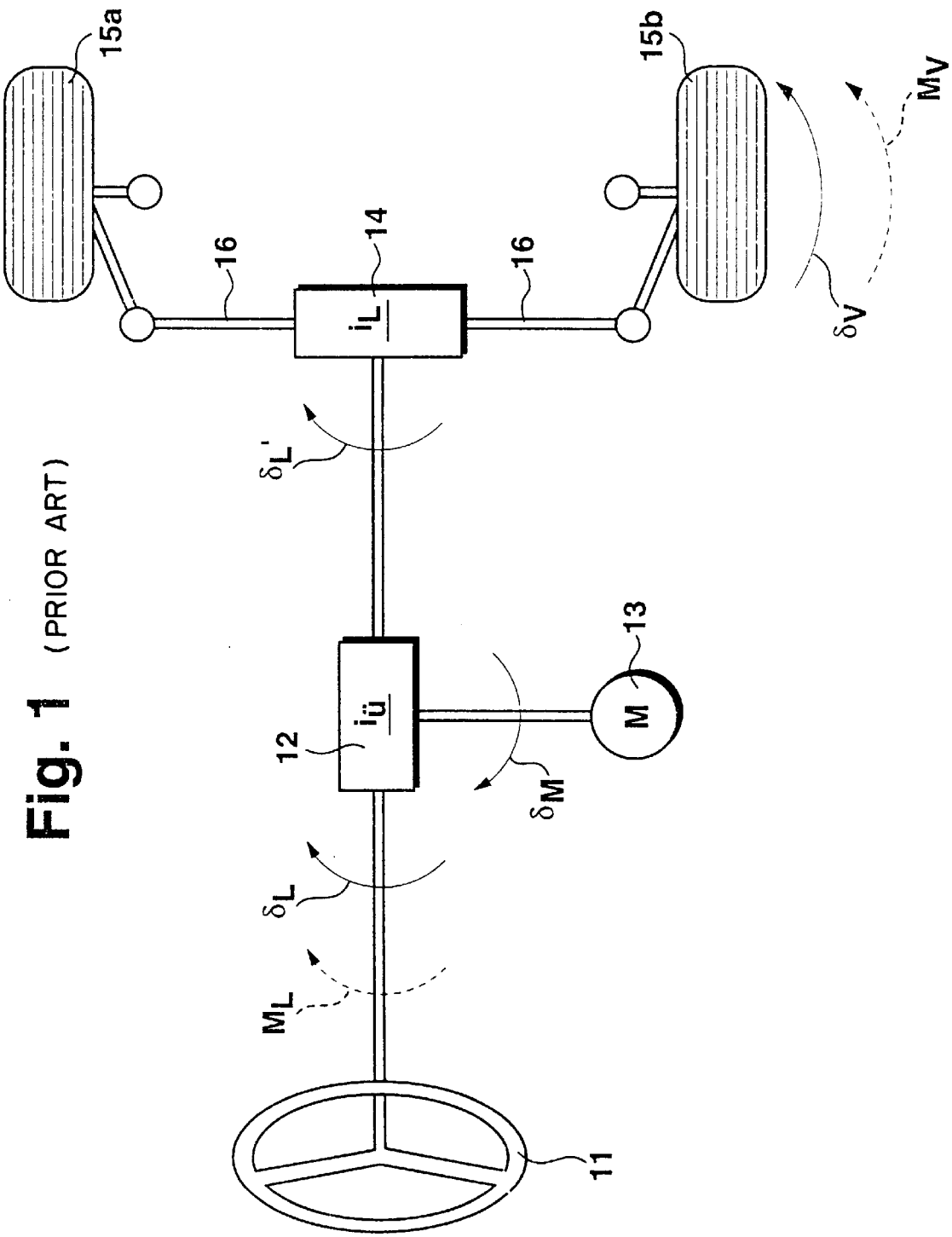
FIGS. 1 and 2 show schematically and, respectively, with the aid of a block diagram a combination of an actuator with a steering gear matching the prior art.
Figure 2:
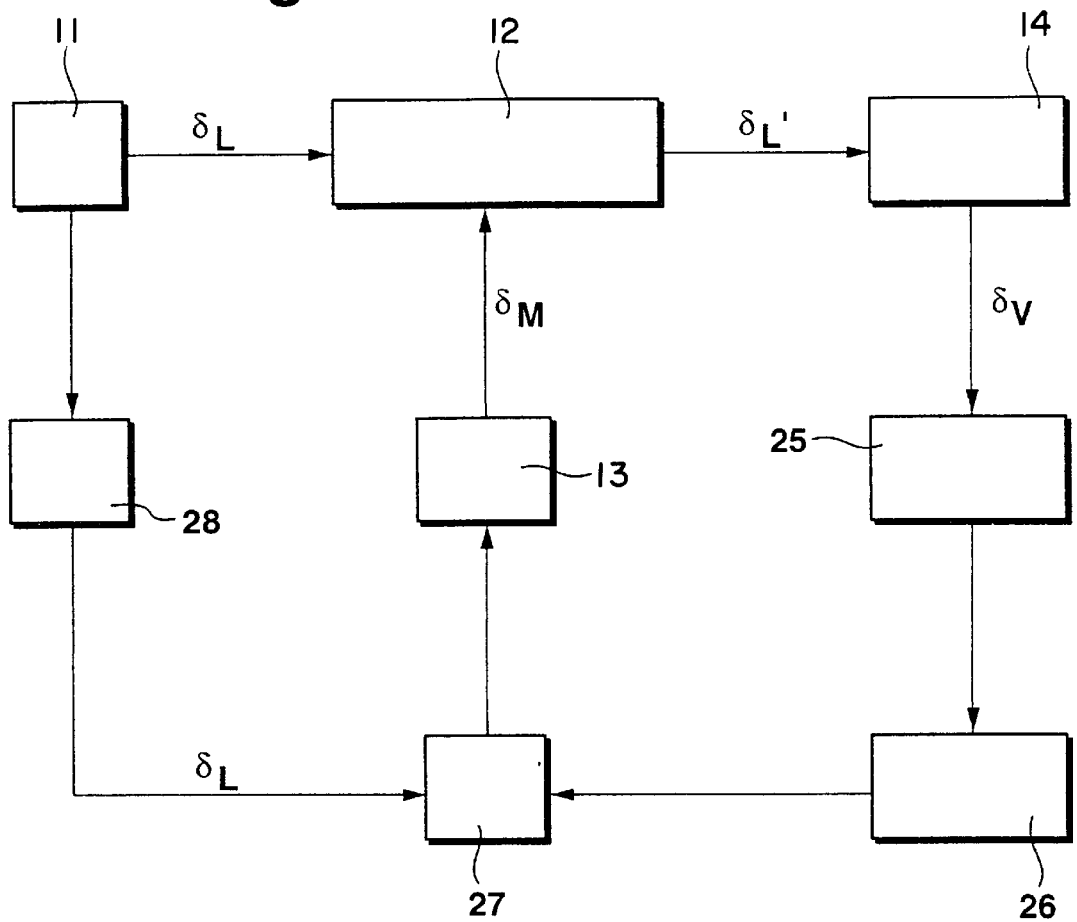

Shown in FIGS. 1 and 2 is a combination of an actuator with a steering gear in a motor vehicle, such as is known from the aforementioned prior art. Referenced 11 is the steering wheel actuated by the driver. By actuation of the steering wheel, the driver applies a steering angle $\delta_L$ and a steering wheel moment $M_L$ which is passed to the actuator 12. The turning angle $\delta_M$ of the actuator motor 13 is superimposed on the movement $\delta_L$ initiated by the driver of the vehicle, by means of the actuator 12. The turning movement $\delta_L'$ created by this superimposition is passed to the steering gear 14 by its input shaft. The steering gear 14 then relays this superimposed movement $\delta_L$ to the steered wheels 15a and 15b for adjustment of a steering angle $\delta_v$. The mechanical gear ratio of the actuator 12 for $\delta_M=0$ is referenced $i_u=\delta_L'/\delta_L$, while the mechanical gear ratio of the steering gear 14 is referenced $i_L$. The steered wheels 15a and 15b are acted upon by the reactive moment $M_v$ influenced by the road. Shown in FIG. 2, additionally, are sensors 26 sensing the vehicle 25 movements, such as yaw movements. The signals of sensors 26 are processed, by means of the control unit 27, to activation signals for the actuator motor 13. Furthermore, element 28 is a steering wheel angle sensor, whose signals are fed to the control unit 27.

The known relations:

$$\delta_v=[\delta_L/i_u+\delta_M]/i_L \quad (1)$$

and $$M_L=M_v/(i_L*i_u) \quad (2)$$

apply between the angles and torques illustrated in FIG. 1, or 2.

A power-assisted steering function is obtained with the steering system shown in FIGS. 1 and 2 in that the steering wheel moment $M_L$ is reduced by a large overall gear ratio $(i_L*i_u)$, that is, by a very indirect steering. Superimposed on the steering wheel angle $\delta_L$ is a motor angle $\delta_M$ according to the above equation (1), allowing adjustment of a desired front wheel steering angle $\delta_v$ with a not overly large steering wheel angle. Suitable activation of the actuator motor 13 enables adjustment of selective relations between the steering wheel angle and the steering angle, which relations may depend also on the state of travel, e.g., the road speed or the steering wheel angle.

According to the above equation (2), the steering wheel moment $M_L$ depends only on the reactive moment $M_v$ on the steered wheels and, thus, cannot be influenced by motor intervention. Resulting thereof is the previously mentioned problem, that selecting a constant gear ratio of the steering gear cannot accomplish a steering wheel moment, or steering feel, that is acceptable for all states of travel. Especially, the steering wheel moment $M_L$ must not become too large with large steering angles with the vehicle at rest, whereas when traveling at high speed it must not become too small.

Figure 3:
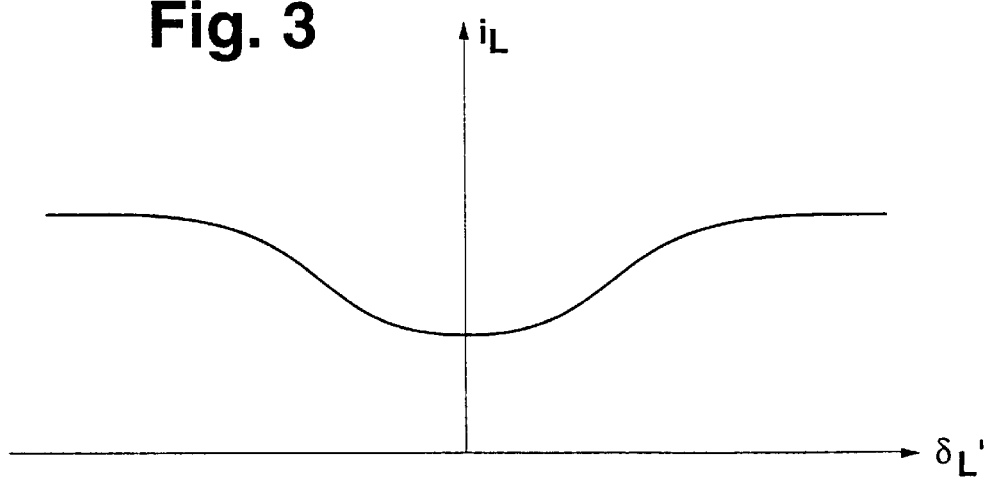

Proposed for solving the problem, as can be seen from FIG. 3, is providing the steering gear 14 with a variable gear ratio. FIG. 3 shows the gear ratio $i_L$ of the steering gear 14 dependent on the turning input angle $\delta_L'$. The gear ratio $i_L$ is, in the range of small turning input angles $\delta_L'$, selected to be smaller than for larger turning input angles. The gear ratio of the steering gear 14 is thus stroke-dependent. For exemplary mechanical configuration of such steering gear that is geared depending on stroke, reference is made to the initially mentioned article "Evolution in the Steering Technology," Automobilindustrie April/May-91, pages 315 through 321.

Figure 4A:
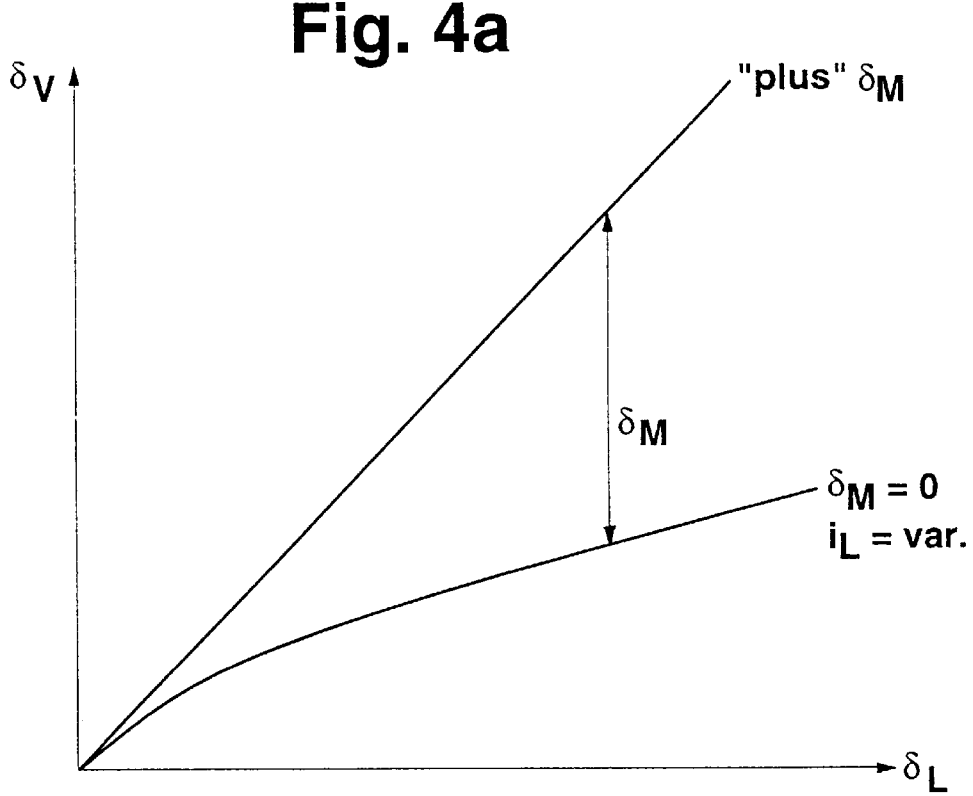
FIGS. 4, 5 and 6 show turning angle patterns, or moment patterns, at different points of the system according to the invention.
Figure 4B:
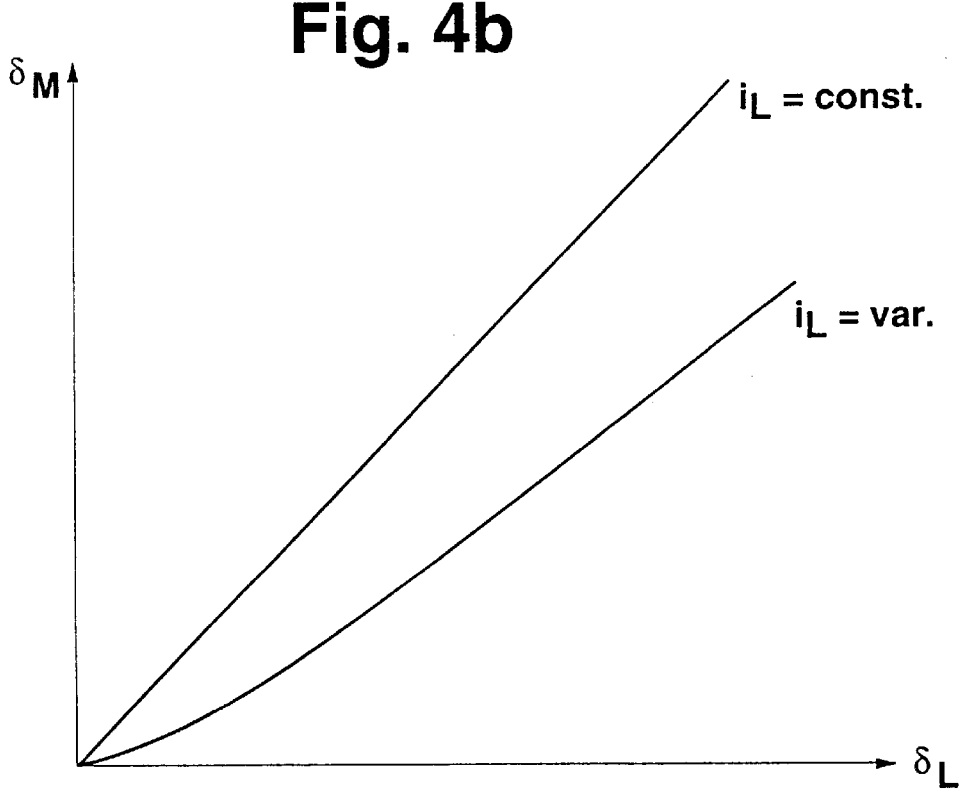
Figure 5:
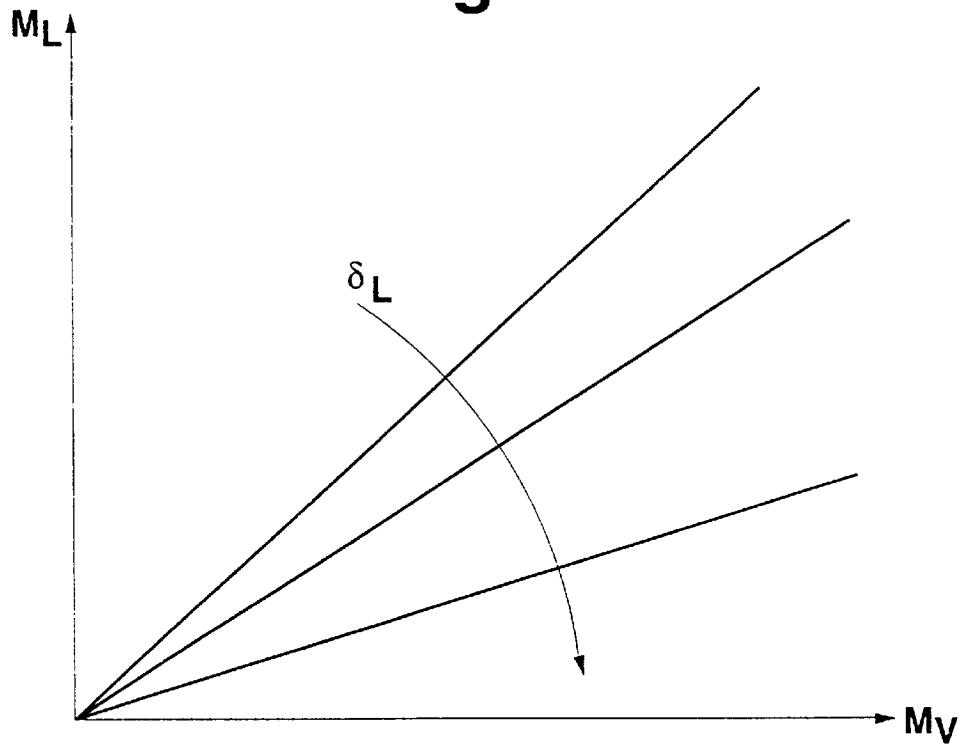
Figure 6:
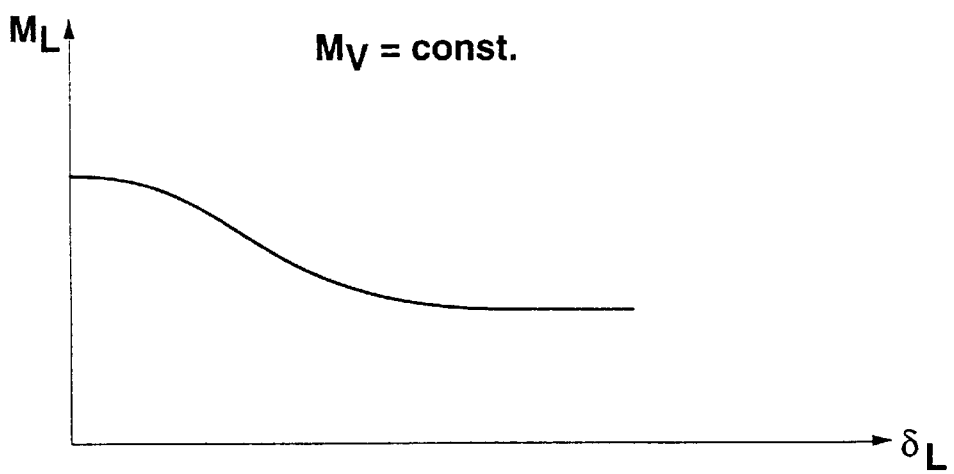

A stroke-dependent gear ratio $i_L$ of the steering gear as illustrated in FIG. 3 produces the patterns shown in FIGS. 4–6.

FIG. 4a illustrates the steering angle $\delta_v$ as a function of the steering wheel angle $\delta_L$. The assumption in the bottom curve of FIG. 4a is that the tuning movement $\delta_M$ initiated by the actuator motor 13 equals zero. The nonlinear relationship between the turning movements $\delta_L$ and $\delta_v$ illustrated in the bottom curve of FIG. 4a is thus arrived at.

FIG. 4b depicts the turning movement $\delta_M$, initiated by the actuator motor 13 dependent on the steering wheel angle $\delta_L$, the assumption being that a linear relationship is to be established between $\delta_L$ and $\delta_v$. According to the prior art ($i_L$=constant), a proportional movement $\delta_M$ is superimposed to assist the steering wheel movement $\delta_L$. This can be seen in the upper, rough pattern of FIG. 4b. When in accordance with the invention the gear ratio $i_L$ of the steering gear 14 is chosen to be variable (FIG. 3), the actuator motor 13 is inventionally activated by the controller 27 as a function of the steering wheel movement $\delta_L$, such as illustrated in the bottom pattern of FIG. 4b.

The activation of the actuator motor 13 shown in the bottom curve pattern of FIG. 4b produces the dependence between the steering angle $\delta_v$ and steering wheel angle $\delta_L$ as shown in the top curve pattern of FIG. 4a. This dependence is essentially linear, as desired.

An appropriate activation of the actuator motor 13 (FIG. 4b, bottom pattern) engenders a quasi "compensation" of the variable-design gear ratio $i_L$ of the steering gear (FIG. 3) as regards the turning angle.

That is, due to the variable gear ratio $i_L$ the driver senses, with respect to link between the steering wheel angle $\delta_L$ and the steering angle $\delta_v$, no change as compared to the prior art. This is evident also from the aforementioned equation 1.

The situation is different when viewing the respective moments. Here, FIG. 5 illustrates the steering wheel moment $M_L$ as as a function of reactive moment $M_v$ that is active on the steered wheels. As is evident from equation 2, the linear relationship between the moments illustrated in FIG. 5 changes depending on the gear ratio $i_L$ of the steering gear and, thus, depending on the steering wheel angle $\delta_L$.

A different presentation of these circumstances derives from FIG. 6. Here, the steering wheel moment $M_L$ is shown as a function of steering wheel angle $\delta_L$ in the case when the reactive moment $M_v$ is assumed to be constant. FIG. 6 clearly evidences that the steering wheel moment $M_L$ felt by the driver is at constant reactive moment $M_v$ greater in the range of small steering wheel angles than it is in the range of large steering wheel angles.

Achieved with the variable gear ratio of the steering gear 14 according to the invention, for one, and with the appropriate activation of the actuator motor 13 for another, is that large steering wheel moments with large steering angles are avoided with the vehicle at rest, but without losing, at high travel speeds and small steering wheel angles the driver's good steering feel (large steering wheel moments).

As described in the aforementioned articles, a stroke-dependent gear ratio of the steering gear can be realized, e.g., with rack-and-pinion drives. Another option of making the gear ratio stroke-dependent consists in a suitable configuration of the gear mechanism between steering gear and wheels.

We claim:

1. Steering system for a motor vehicle, comprising: a steering wheel; a steered axle; an actuator motor; an actuator having a plurality of inputs and an output, said steering wheel operatively connected to one of said actuator inputs, said actuator motor operatively connected to another of said actuator inputs; and a steering gear, said steering gear having a variable mechanical gear ratio, said steering gear operatively connected to said actuator output and said steered axle whereby movement of said steered axle is responsive to movement of said steering gear, and movement of said steering gear is responsive to movement of said actuator output.

2. Steering system according to claim 1, wherein said mechanical gear ratio is smaller for small actuator output movements than for actuator output movements of greater magnitude.

3. Steering system according to claim 1 wherein movement of said steering wheel is associated with a steering wheel angle of said steering wheel.

4. Steering system according to claim 3, wherein movement of said actuator motor is associated with a turning angle whereby movement of the actuator output is responsive to a combination of said turning angle and said steering wheel angle.

5. Steering system according to claim 4, wherein said turning angle is responsive to said steering wheel angle and said mechanical gear ratio.

6. Steering system according to claim 3, wherein movement of said steering wheels is responsive to a steering wheel moment associated with a reactive moment of said steered wheels, said mechanical gear ratio of said steering gear configured such that said reactive moment is less effective on said steering wheel for smaller steering angles than for larger steering angles.

7. Steering device for a motor vehicle, comprising: a driver-actuated steering wheel operatively connected with a first input shaft of an actuator, said actuator having an output shaft operatively connected with an input shaft of a steering gear, said steering gear having a variable mechanical gear ratio, said steering gear operatively connected via a steering linkage with at least two steered wheels of at least one steered axle, said actuator having a second input shaft operatively connected to an actuator motor.

8. Steering device according to claim 7, wherein said variable gear ratio is smaller for smaller turns of said input shaft of said steering gear than for larger turns of said input shaft of said steering gear.

9. A method for steering a vehicle, comprising the steps of:

providing a steering wheel, an actuator motor, a steered axle, a steering gear and an actuator having a plurality of inputs, the steering wheel and the actuator motor operatively connected to respective inputs of the actuator, the steering gear having a variable mechanical gear ratio and operatively connected to the output of the actuator, the steered axle operatively connected to the steering gear;

forming an overall movement at the output of the actuator by superimposing movements of the steering wheel and movements of the actuator motor using the actuator;

relaying the overall movement to the steered axle via the steering gear; and varying the mechanical gear ratio of the steering gear in response to different driving conditions.

10. The method for steering a vehicle according to claim 9, wherein the step of varying the mechanical gear ratio comprises varying the mechanical gear ratio to produce a lower gear ratio for small overall movements than for large overall movements.

11. The method of steering a vehicle according to claim 9, further comprising the step of recognizing a steering wheel angle associated with the steering wheel, the steering wheel angle corresponding to a steering movement initiated by the driver.

12. The method for steering a vehicle according to claim 11, further comprising the step of recognizing a turning angle associated with the actuator motor, wherein said step of forming an overall movement comprises forming an overall movement in response to the steering wheel angle and the turning angle.

13. The method of steering a vehicle according to claim 12, wherein the step of recognizing a turning angle comprises recognizing the turning angle based on the steering wheel angle and the mechanical gear ratio.

14. The method for steering a vehicle according to claim 13, further comprising the step of recognizing a steering wheel moment associated with a reactive moment of the steered wheels, wherein the step of varying the mechanical gear ratio comprises varying the mechanical gear ratio so that the steering wheel moment is smaller for small steering angles than for large steering angles.

* * * * *